(12) United States Patent
Belling et al.

(10) Patent No.: US 9,060,005 B2
(45) Date of Patent: Jun. 16, 2015

(54) METHOD, APPARATUS, SYSTEM AND RELATED COMPUTER PROGRAM PRODUCT FOR HANDOVER MANAGEMENT

(75) Inventors: Thomas Belling, Erding (DE); Peter Leis, Penzberg (DE); Martin Oettl, Weilheim (DE); Ulrich Wiehe, Bad Hersfeld (DE); Miikka Juhana Poikselka, Espoo (FI); Robert Ropolyi, Victoria (AU)

(73) Assignee: Nokia Solutions and Networks Oy, Espoo (FI)

( * ) Notice: Subject to any disclaimer, the term of this patent is extended or adjusted under 35 U.S.C. 154(b) by 603 days.

(21) Appl. No.: 12/997,153

(22) PCT Filed: Jun. 9, 2009

(86) PCT No.: PCT/EP2009/056871
§ 371 (c)(1),
(2), (4) Date: Dec. 9, 2010

(87) PCT Pub. No.: WO2009/150092
PCT Pub. Date: Dec. 17, 2009

(65) Prior Publication Data
US 2011/0096746 A1    Apr. 28, 2011

(30) Foreign Application Priority Data

Jun. 11, 2008  (EP) .................................. 208057322

(51) Int. Cl.
| H04W 72/04 | (2009.01) |
| H04W 36/00 | (2009.01) |
| H04W 60/06 | (2009.01) |
| H04L 29/06 | (2006.01) |
| H04W 8/06 | (2009.01) |
| H04W 8/12 | (2009.01) |

(52) U.S. Cl.
CPC ............. *H04L 65/1073* (2013.01); *H04W 8/06* (2013.01); *H04L 65/1006* (2013.01); *H04W 36/005* (2013.01); *H04W 8/12* (2013.01); *H04W 60/06* (2013.01); *H04L 69/28* (2013.01)

(58) Field of Classification Search
USPC ........... 370/328, 329, 331, 338; 455/436–439
See application file for complete search history.

(56) References Cited

U.S. PATENT DOCUMENTS

| 6,725,036 B1 * | 4/2004 | Faccin et al. .................. 455/433 |
| 7,054,307 B2 * | 5/2006 | Papadimitriou et al. ...... 370/353 |
| 7,177,642 B2 * | 2/2007 | Sanchez Herrero et al. ......................... 455/435.1 |

(Continued)

FOREIGN PATENT DOCUMENTS

| CN | 1838610 A | 9/2006 |
| CN | 101115239 A | 1/2008 |
| EP | 1770949 A2 | 4/2007 |

OTHER PUBLICATIONS

C1-081936, 3GPP TSG CT WG1 Meeting #53, Motorola, Cape Town, South Afrika, May 5-9, 2008, 4pgs.

(Continued)

*Primary Examiner* — Candal Elpenord
(74) *Attorney, Agent, or Firm* — Harrington & Smith

(57) ABSTRACT

It is disclosed a method including accepting, after storage of a registration message including first address information received from a first serving entity capable of access technology-independent service control, a de-registration request message including second address information identical to the first address information from a second serving entity capable of access technology-independent service control.

17 Claims, 5 Drawing Sheets

(56) References Cited

U.S. PATENT DOCUMENTS

| | | | |
|---|---|---|---|
| 7,522,921 B2* | 4/2009 | Thompson | 455/433 |
| 7,623,865 B2* | 11/2009 | Julka et al. | 455/439 |
| 7,840,213 B2* | 11/2010 | Liu et al. | 455/433 |
| 7,974,604 B2* | 7/2011 | Yan et al. | 455/411 |
| 8,331,314 B2* | 12/2012 | Qiang et al. | 370/331 |
| 8,514,870 B2* | 8/2013 | Ma et al. | 370/410 |
| 2002/0024943 A1* | 2/2002 | Karaul et al. | 370/338 |
| 2003/0154400 A1* | 8/2003 | Pirttimaa et al. | 713/201 |
| 2006/0239229 A1* | 10/2006 | Marinescu et al. | 370/331 |
| 2008/0247385 A1* | 10/2008 | Witzel et al. | 370/352 |
| 2009/0296688 A1* | 12/2009 | Bakker et al. | 370/352 |

OTHER PUBLICATIONS

S2-091340, 3GPP TSG-Sa WGs, Meeting #71, ZTE, Budapest, Hungary, Feb. 16-20, 2009, 4 pgs.

3GPP_TS_23228V7120 (Jun. 2008), 3$^{rd}$ Generation Partnership Project; Technical Specification Group Services and System Aspects; IP Multimedia Subsystem (IMS); Stage 2 (Release 7), 222 pgs.

3GPP TS 23.292, V1.0.0 (Jun. 2008), 3$^{rd}$ Generation Partnership Project; Technical Specification Group Services and System Aspects; IP Multimedia Subsystem (IMS) Centralized Services; Stage 2 (Release 8), 90 pgs.

3GPP TS 23.292, V8.0.0 (Jun. 2008), 3$^{rd}$ Generation Partnership Project; Technical Specification Group Services and System Aspects; IP Multimedia Subsystem (IMS) Centralized Services; Stage 2 (Release 8), 89 pgs.

3GPP TS 24.229, V6.18.0 (Jun. 2008), 3$^{rd}$ Generation Partnership Project; Technical Specification Group Core Network and Terminals; IP Multimedia Call Control Protocol (SIP) and Session Description Protocol (SDP); Stage 3 (Release 6), 307 pgs.

* cited by examiner

METHOD, APPARATUS, SYSTEM AND RELATED COMPUTER PROGRAM PRODUCT FOR HANDOVER MANAGEMENT

FIELD OF THE INVENTION

The present invention relates to handover management. More specifically, the present invention relates to a method, an apparatus, a system and a related computer program product for handover management. Examples of the present invention may be applicable to a mobile switching center (MSC) e.g. enhanced for internet protocol (IP) multimedia subsystem (IMS) centralized services (ICS).

BACKGROUND

The $3^{rd}$ generation partnership project (3GPP) currently specifies the so-called "IMS centralized services" (ICS). The stage 2 description is given e.g. in technical specification (TS) 23.292. The basic idea is to centralize the service control in the 3GPP internet protocol multimedia subsystem (IMS, see e.g. 3GPP TS 23.228 and 24.229) independent from the access type being used, i.e. even if the serving access network for a speech bearer is in a 3GPP circuit switched (CS) domain.

The TS 23.292 defines e.g. the MSC server enhanced for ICS. Such an enhanced MSC server allows a user equipment (UE) (including e.g. a legacy global system for mobile communications (GSM) UE) to obtain services provided e.g. by the IMS without having any ICS specific functionalities. The MSC server enhanced for ICS may provide for interworking of user-network signaling received over the CS access (e.g. A/Iu and E interface) to IMS SIP (Session Initiation Protocol) and vice versa. This also covers e.g. registration and de-registration in the IMS on behalf of the UE.

There have been approaches addressing the above functionalities.

One such approach is described e.g. in section 7.2.1.2 'Registration using I2 reference point' of TS 23.292, namely the registration procedure when the UE moves (or performs e.g. international mobile subscriber identity (IMSI) attach) towards a MSC Server enhanced for ICS.

FIG. 1 corresponds to FIG. 7.2.1.2-1 in TS 23.292, and shows a communication network 100 that may comprise a UE 101 and a network (not shown). In turn, the network may comprise an MSC server 1021, an optional interrogating call session/state control function (I-CSCF) 1022, a serving CSCF (S-CSCF) 1023, a home subscriber server/home location register (HSS/HLR) 1024 and a service centralization and continuity application server (SCC AS) 1024.

FIG. 1 shows how e.g. IMS registration is performed by the MSC Server enhanced for ICS e.g. upon CS attach.

In step 1, the UE 101 may initiate CS attach procedures towards the CS network.

In step 2, e.g. the MSC server 1021 and the HSS/HLR 1024 being part of the CS network may perform CS location update, authentication and obtaining subscriber data.

In step 3, e.g. the MSC server 1021 may return a CS attach accept to UE 101.

In step 4, e.g. the MSC server 1021 may decide to initiate an IMS registration for this subscriber.

In step 5, e.g. the MSC server 1021 may derive a domain name from the subscriber's identity (e.g. IMSI) and may discover the address of the appropriate I-CSCF/interconnection border control function (IBCF).

In step 6, e.g. the MSC server 1021 may transmit e.g. a SIP REGISTER message to the IMS (e.g. to the I-CSCF 1022) with a private and temporary public user identity derived from the subscriber's IMSI as well as an InstanceID. The REGISTER message may also contain information indicating the capabilities and characteristics of the MSC server 1021 as a SIP User Agent Client. E.g. the I-CSCF 1022 may verify that the incoming REGISTER message origins from a trusted MSC server (in the same way the I-CSCF 1022 would check that a normal REGISTER message origins e.g. from a trusted proxy CSCF (P-CSCF)).

In step 7, e.g. the I-CSCF 1022 may initiate procedures for location/allocation of the S-CSCF 1023.

In step 8, e.g. the I-CSCF 1022 may forward the REGISTER message e.g. to the S-CSCF 1023.

In step 9, e.g. the S-CSCF 1023 may identify the REGISTER message as being from the MSC server 1021. The S-CSCF 1023 may skip any further authentication procedures and may perform registration procedures e.g. with the HSS/HLR 1024.

In step 10, e.g. the S-CSCF 1023 may perform service control execution procedures. For example, filter criteria may direct the S-CSCF 1023 to transmit a REGISTER message e.g. to the SCC AS 1025.

Finally, in step 11, the IMS registration procedures are completed.

In addition, e.g. section 7.2.1.3 'Deregistration using I2 reference point' of TS 23.292 describes the de-registration procedure when the UE 101 moves from a MSC Server 1021 enhanced for ICS towards a MSC server (not shown) not enhanced for ICS.

FIG. 2 corresponds to FIG. 7.2.1.3-1 in TS 23.292, and may comprise the UE 101, the network (not shown), the MSC server 1021, the optional I-CSCF 1022, the S-CSCF 1023, the HSS/HLR 1024 and the SCC AS 1025 already described herein above in conjunction with FIG. 1. Furthermore, as shown in FIG. 2, the network may further comprise a visited MSC (VMSC) 1021'.

FIG. 2 shows how IMS de-registration may be performed by the MSC Server 1021 enhanced for ICS upon detection of the location cancellation procedure. Identical IMS deregistration procedures may be initiated by the MSC Server 1021 enhanced for ICS upon receipt of any other indication that the UE 101 may be no longer considered active at this MSC/visited location register (VLR).

In step 1, e.g. the UE 101 may initiate location updating procedures towards the CS network, e.g. the VMSC 1021'.

In step 2, e.g. the VMSC 1021' and the HSS/HLR 1024 being part of the CS network may perform CS location updating and authentication procedures.

In step 3, e.g. the HSS/HLR 1024 may initiate location cancellation procedures e.g. towards the old VLR/MSC server 1021.

In step 4, e.g. the MSC server 1021 may initiate IMS de-registration for this subscriber (e.g. UE 101) by transmitting e.g. a SIP REGISTER message e.g. with an expiration time of zero seconds to the I-CSCF 1022.

In step 5, e.g. the I-CSCF 1022 may initiate procedures for location of the S-CSCF 1023.

In step 6, e.g. the I-CSCF 1022 may forward the REGISTER message to the S-CSCF 1023.

In step 7, e.g. the S-CSCF 1023 may identify the REGISTER message as being from the MSC server 1021 which is a trusted network node. The S-CSCF 1023 may perform deregistration procedures with the HSS/HLR 1024.

In step 8, e.g. the S-CSCF 1023 may perform service control execution procedures. For example, filter criteria may direct the S-CSCF 1023 to transmit a REGISTER message to the SCC AS 1025.

Finally, in step 9, the IMS deregistration procedures are completed.

However, TS 23.292 does not describe the case when a UE moves from one MSC Server enhanced for ICS to another MSC Server enhanced for ICS. So, if registration is performed first, the de-registration procedure would delete the new registered contact address. In other words, TS 23.292 describes the registration and de-registration procedures in section 7.2. The de-registration procedure caused by a normal location update (UE has moved to another Location Area) from one MSC Server enhanced for ICS towards a MSC Server without this enhancement is described in section 7.2.1.3. A description when the UE moves to another MSC Server enhanced for ICS is not contained or mentioned in TS 23.292.

In consideration of the above, it is an object of examples of the present invention to overcome one or more of the above drawbacks. In particular, the present invention provides a method, an apparatus, a system and a related computer program product for handover management.

According to an example of the present invention, in a first aspect, this object is for example achieved by a method comprising:

accepting, after storage of a registration message comprising first address information received from a first serving entity capable of access technology-independent service control, a de-registration request message comprising second address information identical to the first address information from a second serving entity capable of access technology-independent service control.

According to further refinements of the example of the present invention as defined under the above first aspect, the method further comprises storing the received registration message;

the method further comprises comparing the first and second address information with each other, and wherein the accepting is performed based on a result of the comparing;

the accepting is performed if at least one of the first and second serving entities is capable of enabling network entities different from the first and second serving entities to perform de-registration on behalf of a network terminal;

the method further comprises, prior to the accepting, receiving the de-registration message;

the method further comprises, after the receiving, deferring an interaction with a network subscriber server entity by a settable period of time;

if another registration message is received during the settable period of time, a portion of the interaction is performed;

the first and second address information are constituted by an internet protocol address for session initiation protocol signaling;

the internet protocol address for session initiation protocol signaling is comprised in a contact header;

the first and second serving entities are constituted by mobile switching center servers;

the access technology-independent service control is constituted by internet protocol multimedia subsystem centralized services.

According to an example of the present invention, in a second aspect, this object is for example achieved by an apparatus comprising:

means for accepting, after storage of a registration message comprising first address information received from a first serving entity capable of access technology-independent service control, a de-registration request message comprising second address information identical to the first address information from a second serving entity capable of access technology-independent service control.

According to further refinements of the example of the present invention as defined under the above second aspect, the apparatus further comprises means for storing the received registration message;

the apparatus further comprises means for comparing the first and second address information with each other, and wherein the means for accepting is configured to accept based on a result from the means for comparing;

the means for accepting is configured to accept if at least one of the first and second serving entities is capable of enabling network entities different from the first and second serving entities to perform de-registration on behalf of a network terminal;

the apparatus further comprises means for receiving the de-registration message prior to the accepting performed by the means for accepting;

the apparatus further comprises means for deferring, after the receiving performed by the means for receiving, an interaction with a network subscriber server entity by a settable period of time;

the apparatus further comprises means for performing, if another registration message is received during the settable period of time, a portion of the interaction;

the first and second address information are constituted by an internet protocol address for session initiation protocol signaling;

the internet protocol address for session initiation protocol signaling is comprised in a contact header;

the first and second serving entities are constituted by mobile switching center servers;

the access technology-independent service control is constituted by internet protocol multimedia subsystem centralized services;

the apparatus is constituted by a serving call session control function;

at least one, or more of means for accepting, means for comparing, means for receiving, means for deferring, means for performing and the apparatus is implemented as a chipset or module.

According to an example of the present invention, in a third aspect, this object is for example achieved by a system comprising:

a first mobile switching center server capable of access technology-independent service control, for transmitting the registration message comprising the first address information, a second mobile switching center server capable of access technology-independent service control, for transmitting the de-registration message comprising the second address information identical to the first address information; and an apparatus according to the above second aspect.

According to an example of the present invention, in a fourth aspect, this object is for example achieved by a computer program product comprising code means for performing methods steps of a method according to the above first aspect, when run on a processing means or module.

In this connection, it has to be pointed out that examples of the present invention enable one or more of the following:

coping with overlapping registration and de-registration procedures when the UE moves between two MSC servers enhanced for ICS.

Preventing deletion of a newly registered contact address by the de-registration procedure, if registration of the new contact address is performed first.

Closing a gap in TS 23.292, which does not describe the case when a UE moves from one MSC Server enhanced for ICS to another MSC Server enhanced for ICS:

The critical issue in TS 23.292 resides in that there is no time correlation between registration (step 6 in FIG. 1) and de-registration (step 4 in FIG. 2).

TS 23.292 describes the registration and de-registration procedures in its section 7.2. The de-registration procedure caused by a normal location update (UE has moved to another location area) from one MSC server enhanced for ICS towards a MSC server without this enhancement is described in TS 23.292, section 7.2.1.3. However, any description of when the UE moves to another MSC server enhanced for ICS is not contained or mentioned in TS 23.292. So, the problem according to examples of the present invention has not yet been addressed.

BRIEF DESCRIPTION OF THE DRAWINGS

Examples of the present invention are described herein below with reference to the accompanying drawings, in which.

DETAILED DESCRIPTION OF THE PRESENT INVENTION

Examples of the present invention are described herein below by way of example with reference to the accompanying drawings.

It is to be noted that for this description, the terms "IP address for SIP signaling in contact header", "new/old MSC server" and "IMC" are examples for "first and second address information", "first and second serving entities" and "access technology-independent service control", respectively, without restricting the latter-named terms to the special technical or implementation details imposed to the first-named terms.

Figure 1:
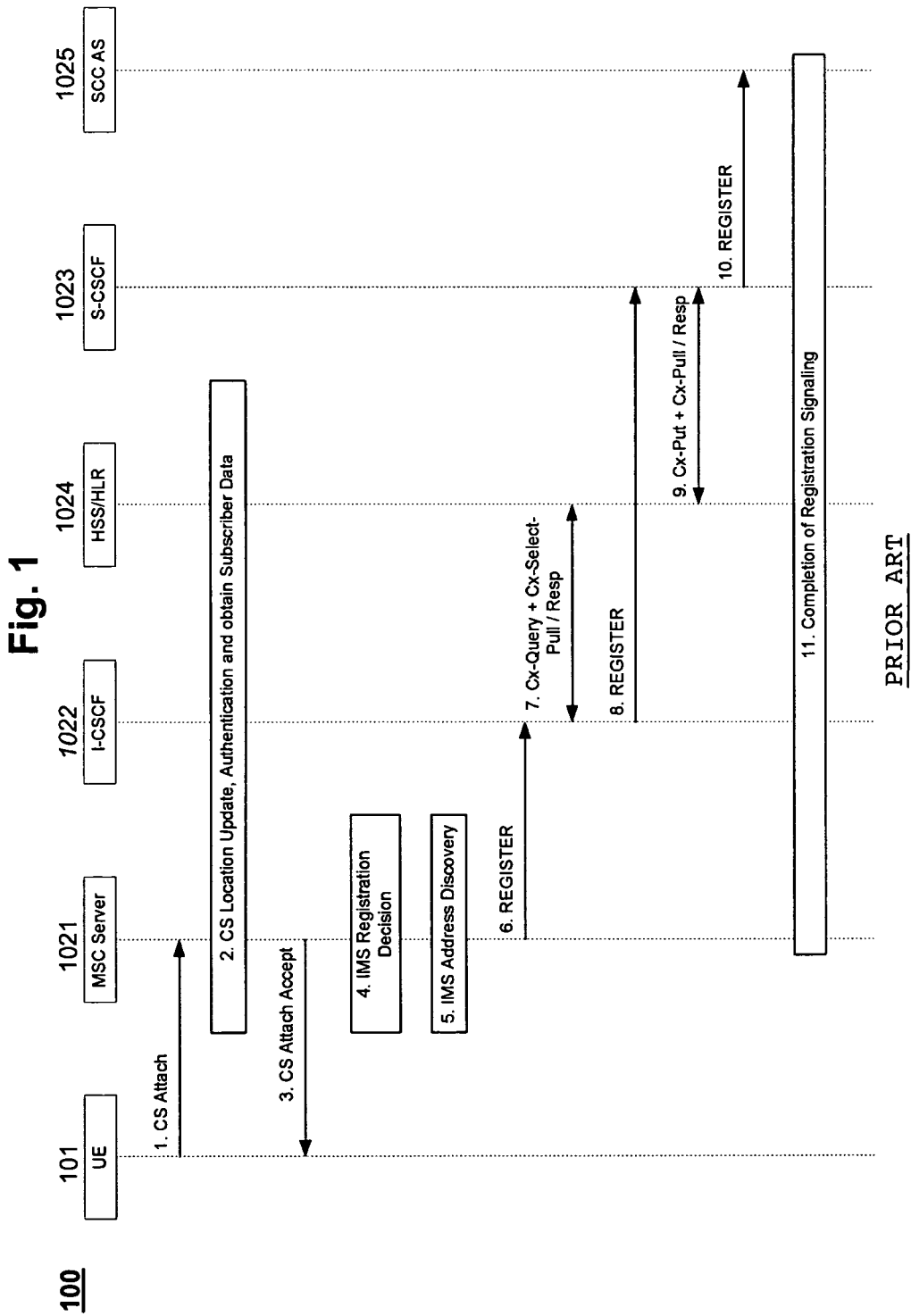
FIG. 1 shows the above-described registration process in TS 23.292.
Figure 2:
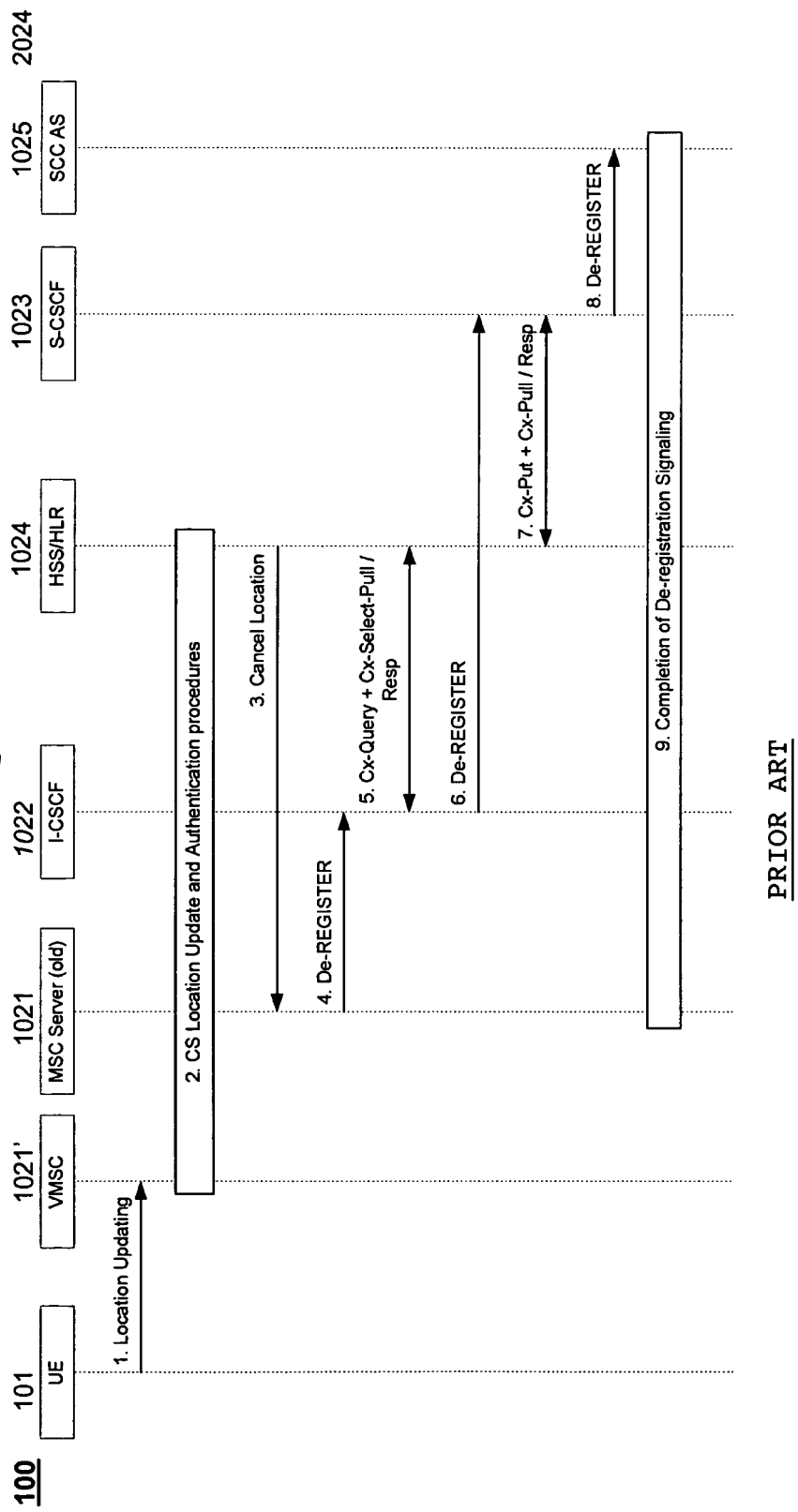
FIG. 2 shows the above-described de-registration process in TS 23.292.
Figure 3:
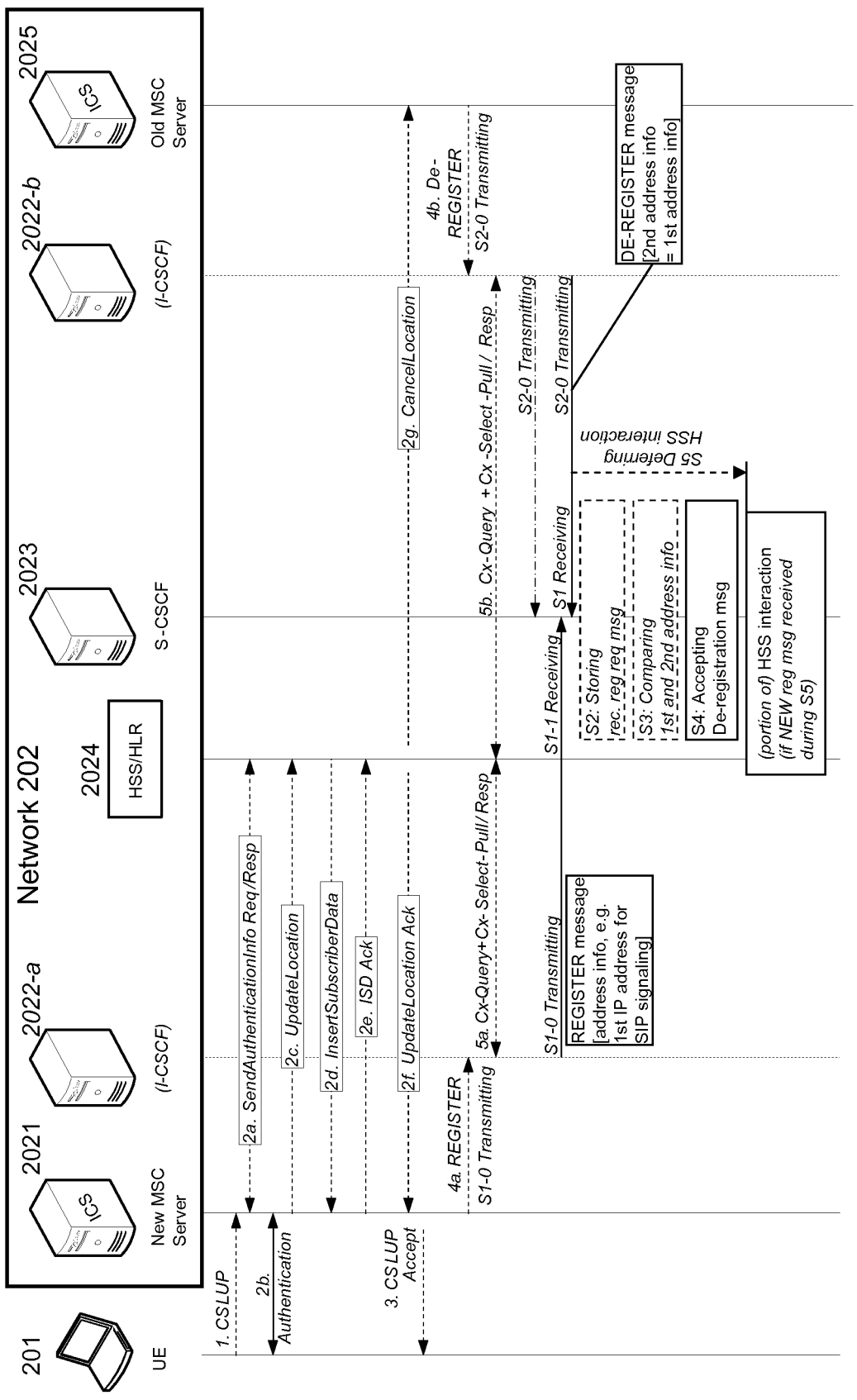
FIG. 3 shows a method for handover management according to an example of the present invention.

FIG. 3 shows a method according to an example of the present invention for handover management. Signaling between elements is indicated in horizontal direction, while time aspects between signaling may be reflected in the vertical arrangement of the signaling sequence as well as in the sequence numbers. It is to be noted that the time aspects indicated in FIG. 3 do not necessarily restrict any one of the method steps shown to the step sequence outlined. This applies in particular to method steps that are functionally disjunctive with each other: for example, step S5 (deferring) is shown to defer the HSS interaction to a point in time after completion of the accepting in step S4; However, the deferring may also comprise shorter periods of time, e.g. before, in or after any one of steps S2 to S4. Within FIG. 3, for ease of description, means or portions which may provide main functionalities are depicted with solid functional blocks or arrows and a normal font, while means or portions which may provide optional functions are depicted with dashed functional blocks or arrows and an italic font.

As shown in FIG. 3, a communication system 200 may comprise a UE 201 and a network 202 which in turn may comprise an MSC server 2021 capable of ICS and being a handover target (referred to as "new MSC server" 2021 hereinafter), optional I-CSCFs 2022-*a*; 2022-*b*, a S-CSCF 2023, a HSS/HLR 2024 and an MSC server 2025 capable of ICS and being a handover origin (referred to as "old MSC server" hereinafter). Furthermore, the S-CSCF 2023 and e.g. the old or new MSC server 2025/2021 may also be disposed as an integral entity (not shown).

As optional preparatory measures, in messages 1, 2*a* to 2*g* and 3, the UE 201 and the network 202 may perform preparatory measures for handover between the new MSC server 2021 and the old MSC server 2025.

Figure 4:
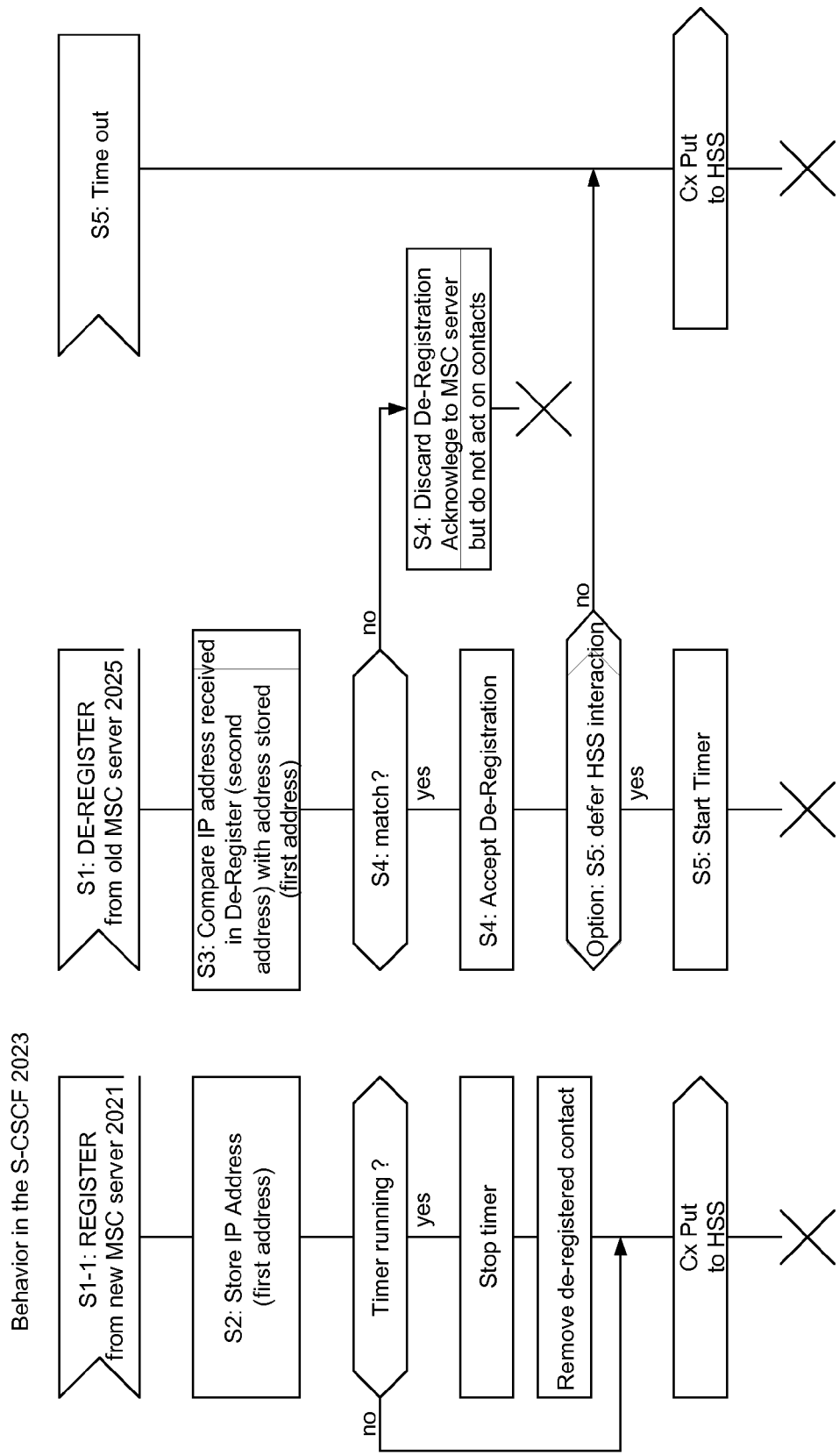
FIG. 4 shows a flow chart for the method for handover management according to an example of the present invention.

In an optional step S1-0 (or message 4*a*), e.g. the new MSC server 2021 may perform transmitting a registration message comprising first address information to the S-CSCF 2023 e.g. via the optional I-CSCF 2022-*a*. As shown in FIGS. 3 and 4, in an optional step S1-1, the registration message transmitted may be received by the S-CSCF 2023.

In an optional step S2-0 (or message 4*b*), e.g. the old MSC server 2025 may perform transmitting a de-registration message comprising second address information identical to the first address information transmitted by the old MSC server 2025 in a previously sent REGISTER message (not shown in FIG. 3) to the S-CSCF 2023 e.g. via the optional I-CSCF 2022-*b*. As shown in FIGS. 3 and 4, in an optional step S1, the de-registration message transmitted may be received by the S-CSCF 2023.

As shown in FIGS. 3 and 4, in an optional step S2, e.g. the S-CSCF 2023 may perform storing the received registration message or just the first address information.

As shown in FIGS. 3 and 4, in a further optional step S3, e.g. the S-CSCF 2023 may perform comparing the first and second address information with each other. The subsequent step S4 may be performed based on a result of the comparing (see FIG. 4, "S3: match").

As shown in FIGS. 3 and 4, in step S4, e.g. the S-CSCF 2023 may then perform accepting, after storage (stored e.g. in optional step S2) of the registration message comprising the first address information (e.g. an IP address for SIP signaling e.g. in contact header) received (received e.g. in optional step S1-1) from a first serving entity (e.g. the new MSC server 2021) capable of access technology-independent service control (e.g. IMC), a de-registration request message comprising the second address information identical to the first address information from a second serving entity (e.g. old MSC server 2025) capable of access technology-independent service control (e.g. IMC). As shown in FIG. 4, it is to be noted that the term "accepting" may contain both meanings of "accepting" and "discarding" the de-registration (message).

Furthermore, as shown in FIGS. 3 and 4, in an optional step S5, e.g. the S-CSCF 2023 may perform, after the receiving, deferring an interaction with a network serving entity (e.g. the HSS/HLR 2024) by a settable period of time (e.g. by means of a timer, see "S5: Start timer" and "S5: Time out" in FIG. 4). In this context, if another registration message is received during the settable period of time, a portion of the interaction may also be performed.

As for further refinements of the method according to an example of the present invention, the accepting of the de-registration message may be performed if at least one of the first and second serving entities is capable of enabling other network entities (i.e. network entities being different from the first and second serving entities) to perform de-registration on behalf of a network terminal (e.g. the UE 201).

Furthermore, the first and second address information may be constituted by an internet protocol address for session initiation protocol signaling. Moreover, the internet protocol address for session initiation protocol signaling may be comprised in a contact header. In addition, the first and second serving entities may be constituted by mobile switching center servers. Still further, the access technology-independent service control may be constituted by internet protocol multimedia subsystem centralized services (ICS).

Figure 5:
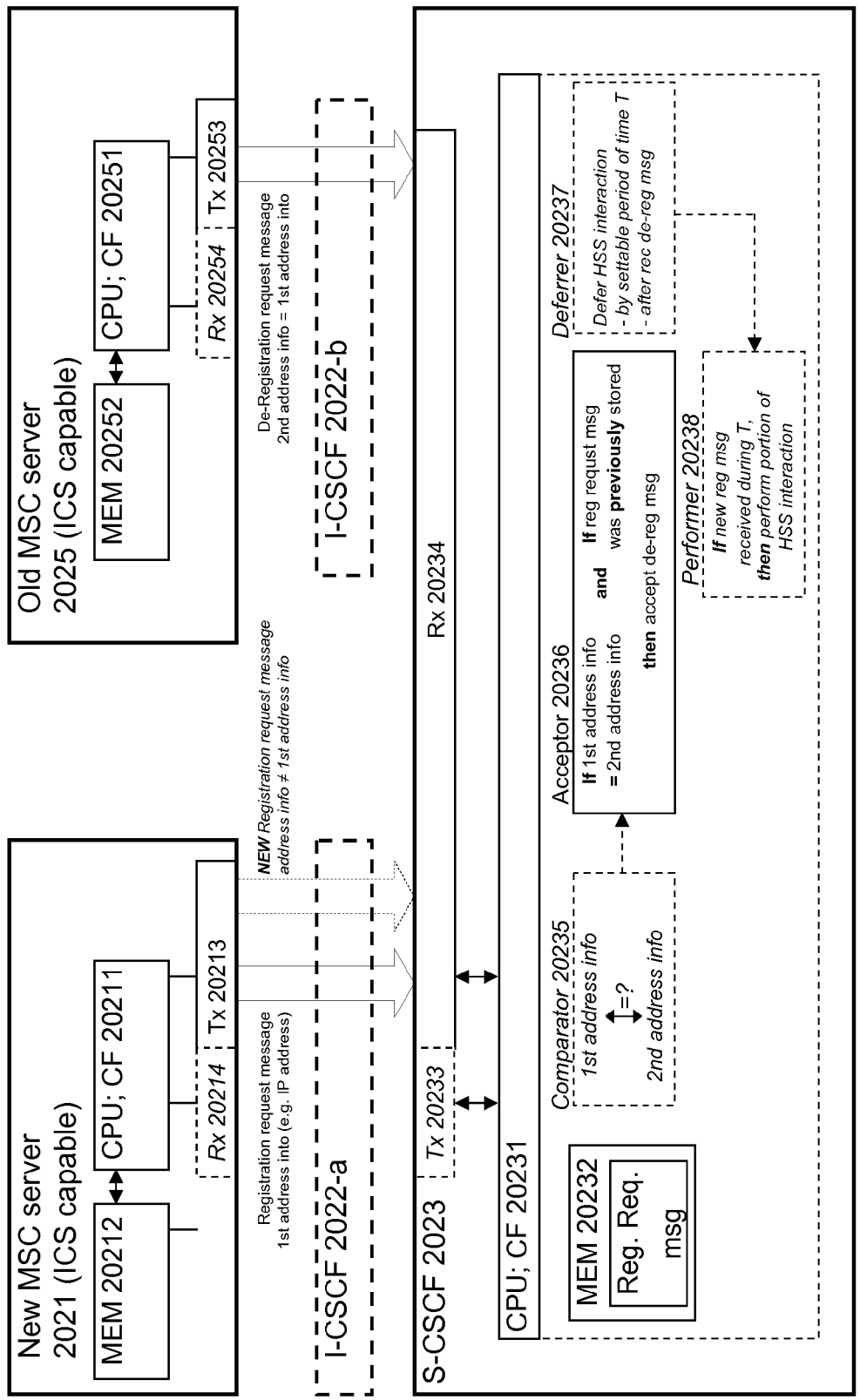
FIG. 5 shows an apparatus (e.g. S-CSCF) for handover management according to an example of the present invention.

FIG. 5 shows an example of a respective apparatus (e.g. S-CSCF 2023) for handover management according to examples of the present invention. Within FIG. 5, for ease of description, means or portions which may provide main functionalities are depicted with solid functional blocks or arrows and a normal font, while means or portions which may provide optional functions are depicted with dashed functional blocks or arrows and an italic font.

The new MSC server 2021 may be ICS capable and may comprise a CPU (or core functionality CF) 20211, a memory 20212, a transmitter (or means for transmitting) 20213 and an optional receiver (or means for receiving) 20214.

Likewise, the old MSC server may be ICS capable and may comprise a CPU (or core functionality CF) 20251, a memory 20252, a transmitter (or means for transmitting) 20253 and an optional receiver (or means for receiving) 20254.

Furthermore, the S-CSCF 2023 may comprise a CPU (or core functionality CF) 20231, a memory (or means for storing) 20232, an optional transmitter (or means for transmitting) 20233, a receiver (or means for receiving) 20234, an optional comparator (or means for comparing) 20235, an acceptor (or means for accepting) 20236, an optional deferrer (or means for deferring) 20237 and an optional performer (or means for performing) 20238.

Furthermore, it is to be noted that the CPUs 20221; 20251; 20231 of the old/new MSC servers 2021/2025 and the S-CSCF 2023 may be disposed as separate entities (as shown in FIG. 5) or may alternatively be disposed as an integral entity. As indicated by the dashed extension of the functional block of the CPU 20231, the means for storing (or memory) 20232, the means for comparing 20235, the means for accepting 20236, the means for deferring 20237 and the means for performing 20238 may be functionalities running on the CPU 20231 or may alternatively be separate functional entities or means.

The CPUs 20x1 (wherein x=21, 23 and 25) may respectively be configured to process various data inputs and to control the functions of the memories 20x2, the means for transmitting 202x3 and the means for receiving 20x4. The memory 20232 may serve e.g. for storing code means for carrying out e.g. the method according to an example of the present invention, when run e.g. on the CPU 20231. It is to be noted that the means for transmitting 20x3 and the means for receiving 20x4 may alternatively be provided as respective integral transceivers. It is further to be noted that the transmitters/receivers may be implemented i) as physical transmitters/receivers for transceiving e.g. via the air interface (e.g. in case of transmitting between the UE 201 and the new/old MSC servers 2021/2025), ii) as routing entities e.g. for transmitting/receiving data packets e.g. in a PS (packet switched) network (e.g. between the new/old MSC servers 2021/2025 and the SCSCF 2023 when disposed as separate network entities), iii) as functionalities for writing/reading information into/from a given memory area (e.g. in case of shared/common CPUs or memories e.g. of new/old MSC servers 2021/2025 and the S-CSCF 2023 when disposed as an integral network entity), or iv) as any suitable combination of i) to iii).

Furthermore, it is to be noted that the new and/or old MSC server 2021/2025 and the S-CSCF 2023 may also be implemented as an integral/combined entity, as mentioned above. In that case, the CPUs 20221, 20231, 20251, the memories 20222, 20232, 20252, the means for transmitting 20223, 20233, 20253 and the means for receiving 20224, 20234, 20254 may respectively be common and/or shared resources.

Optionally, e.g. the means for transmitting 20213 of the new MSC server 2021 may perform transmitting a registration message comprising first address information to the S-CSCF 2023 e.g. via the optional I-CSCF 2022-a. The registration message transmitted by the means for transmitting 20213 may be received by the means for receiving 20234 of the S-CSCF 2023.

Optionally, e.g. the means for transmitting 20253 of the old MSC server 2025 may perform transmitting a de-registration message comprising second address information identical to the first address information to the S-CSCF 2023 e.g. via the optional I-CSCF 2022-b. The registration message transmitted by the means for transmitting 20253 may be received by the means for receiving 20234 of the S-CSCF 2023.

Optionally, e.g. the means for storing 20232 of the S-CSCF 2023 may perform storing the received registration message.

Further optionally, e.g. the means for comparing 20235 of the S-CSCF 2023 may perform comparing the first and second address information with each other. The means for accepting 20236 may be configured to accept based on a result of the comparing effected by the means for comparing 20235.

Then, e.g. the means for accepting 20236 of the S-CSCF 2023 may perform accepting, after storage (stored e.g. by the means for storing 20232) of the registration message comprising the first address information (e.g. an IP address for SIP signaling e.g. in contact header) received (received e.g. by the means for receiving 20234) from a first serving entity (e.g. the new MSC server 2021) capable of access technology-independent service control (e.g. IMC), a de-registration request message comprising the second address information identical to the first address information from a second serving entity (e.g. old MSC server 2025) capable of access technology-independent service control (e.g. IMC).

Furthermore, e.g. the means for deferring 20237 of the S-CSCF 2023 may perform, after the receiving performed by the means for receiving 20234, deferring an interaction with a network serving entity (e.g. the HSS/HLR 2024) by a settable period of time (e.g. by means of a timer). In this context, if another registration message is received during the settable period of time, e.g. the means for performing 20238 of the S-CSCF 2023 may perform performing a portion of the interaction.

As for further refinements of the apparatus according to an example of the present invention, the means for accepting 20236 may be configured to accept if at least one of the first and second serving entities is capable of enabling other network entities (i.e. network entities being different from the first and second serving entities) to perform de-registration on behalf of a network terminal (e.g. the UE 201).

Furthermore, the first and second address information may be constituted by an internet protocol address for session initiation protocol signaling. Moreover, the internet protocol address for session initiation protocol signaling may be comprised in a contact header. In addition, the first and second serving entities may be constituted by mobile switching center servers. Still further, the access technology-independent service control may be constituted by internet protocol multimedia subsystem centralized services (ICS).

Furthermore, at least one of, or more of means for accepting 20236, means for comparing 20235, means for receiving 20234, means for deferring 20237, means for performing 20238 and/or the S-CSCF 2023, or the respective functionalities carried out, may be implemented as a chipset or module.

Finally, the present invention also relates to a system which may comprise the above-described S-CSCF 2023.

Without being restricted to the details following in this section, the embodiment of the present invention may be summarized as follows:

When the UE moves from an MSC Server enhanced for ICS to another MSC Server enhanced for ICS, the situation is as described in the FIG. 3 herein above.

For the De-Registration (from old MSC-Server 2025) and the Registration (from new MSC Server 2021) to be successful it is important that the de-registration message is received before the registration message in the S-CSCF 2023. However, this cannot be guaranteed. This invention therefore proposes the following procedure in the S-CSCF 2023.

According to normal registration procedures, the MSC will encode its IP address for SIP signaling in the Contact header. It is proposed, that the MSC server enhanced for ICS will use the same information in the Contact header for the registration as well as for the de-registration procedure. The S-CSCF 2023 may store the contact information received in the registration and shall only accept a subsequent de-registration request if it comes from the same contact as stored in the previous registration. As an option, the S-SCCF only applies this behavior if the registration/deregistration comes from an MSC. This is to allow that, in cases where the registration/deregistration does not come from an MSC, other network elements perform de-registration on behalf of the UE.

As another option, when receiving de-registration from an MSC, an S-CSCF defers the HSS interaction for a timer-supervised period. If the S-CSCF receives a new registration during this period, it only performs a single HSS interaction to update the point-of-contact with the information within the new registration.

FURTHER EXAMPLES

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

a session initiation protocol may be any application-layer control protocol for creating, modifying and terminating sessions with one or more participants. These sessions may include Internet multimedia conferences, Internet telephone calls, and multimedia distribution. Members in a session can communicate via multicast or via a mesh of unicast relations, or a combination of these;

a call state/server control function may be any function that performs call control functions, service switching functions, address translation functions, and vocoder negotiation functions. The call state control function may be the main call control element in the IP multimedia core network subsystem;

a home subscriber server may be any device, unit or means constituting a master database for a given user, which may be used for keeping a list of features and services associated with a user, and for tracking the location of and means of access for its users. The HSS may provide the functions of the home location register (HLR) in the IMS. The HSS may differs from the HLR in that it may also communicate via IP-based interfaces. In addition, the HSS may provide the functions of the user mobility server (UMS);

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the S-CSCF, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. S-CSCF) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

For ease of clarity, the following table provides a survey of the abbreviations used in the above description. It is to be noted that an "s" following an abbreviation represents the plural of that abbreviation, e.g. "UEs" represents "user equipments".

3GPP 3rd generation partnership project
TR/TS Technical report/technical specification
UE User equipment
MSC Mobile switching center
VMSC Visited MSC
HSS Home subscriber server
HLR Home location register
VLR Visited location register
CPU Central processing unit
IP Internet protocol
IMS IP multimedia subsystem
ICS IMS Centralized Services
SCC AS Service Centralization and Continuity Application Server
CS Circuit switched
PS Packet switched
GSM Global system for mobile communications
IMSI International mobile subscriber identity
CSCF Call session control function
I-CSCF Interrogating CSCF
P-CSCF Proxy CSCF
S-CSCF Serving CSCF
IBCF Interconnection border control function

The invention claimed is:

1. A method, comprising:
    comparing, at a call session control function, first address information to second address information, where the first address information is received in a registration message from a first serving entity capable of access technology-independent service control, and where the second address information is received in a de-registration request message, where the first address information and the second address information are each comprised of an internet protocol address for session initiation protocol signaling and each identifies the first serving entity capable of access technology-independent service control, and where the first address information and the second address information are each received in a contact header; and
    accepting at the call session control function the received de-registration request message if the result of comparing indicates that the second address information is identical to the first address information.

2. The method according to claim 1, wherein the accepting is performed if the first serving entity is capable of enabling network entities different from the first serving entity to perform de-registration on behalf of a network terminal.

3. The method according to claim 1, where the de-registration request message is received one of before or after the registration message is received from the first serving entity capable of access technology-independent service control.

4. The method according to claim 3, further comprising, after receiving the de-registration request message, deferring an interaction with a network subscriber server entity by a settable period of time.

5. The method according to claim 4, wherein, if another registration message is received during the settable period of time, a portion of the interaction is performed.

6. The method according to claim 1, wherein the first serving entity is comprised of a mobile switching center server.

7. The method according to claim 1, wherein the access technology-independent service control is comprised of internet protocol multimedia subsystem centralized services.

8. An apparatus, comprising:
    a receiver;
    a memory that stores processor-executable program code;
    a processor embodied at a call session control function, the processor being connected with the memory and configured by execution of the program code to compare first address information to second address information, where the first address information is received by the receiver in a registration message from a first serving entity capable of access technology-independent service control, and where the second address information is received by the receiver in a de-registration request message, where the first address information and the second address information are each comprised of an internet protocol address for session initiation protocol signaling and each identifies the first serving entity capable of access technology-independent service control, and where the first address information and the second address information are each received in a contact header; and
    the processor embodied at the call session control function further being configured by execution of the program code to accept the received de-registration request message if the result of the comparison indicates that the second address information is identical to the first address information.

9. The apparatus according to claim 8, wherein the processor is further configured by execution of the program code to accept the received de-registration request message if the first serving entity is capable of enabling network entities different from the first serving entity to perform de-registration on behalf of a network terminal.

10. The apparatus according to claim 8, where the receiver is configured to receive the de-registration message one of before or after the registration message is received from the first serving entity capable of access technology-independent service control.

11. The apparatus according to claim 10, where said processor is further configured by execution of the program code to defer, after the receiving performed by the receiver, an interaction with a network subscriber server entity by a settable period of time.

12. The apparatus according to claim 11, where said processor is further configured to perform by execution of the program code, if another registration message is received during the settable period of time, a portion of the interaction.

13. The apparatus according to claim 8, wherein the first serving entity is comprised of a mobile switching center server.

14. The apparatus according to claim 8, wherein the access technology-independent service control is comprised of internet protocol multimedia subsystem centralized services.

15. The apparatus according to claim 8, wherein the apparatus is comprised of a serving call session control function.

16. The apparatus according to claim 8, implemented at least partially as a chipset.

17. A non-transitory computer readable medium storing a computer program product comprising code for performing methods steps that comprise:

comparing, at a call session control function, first address information to second address information, where the first address information is received in a registration message from a first serving entity capable of access technology-independent service control, and where the second address information is received in a de-registration request message, where the first address information and the second address information are each comprised of an internet protocol address for session initiation protocol signaling and each identifies the first serving entity capable of access technology-independent service control, and where the first address information and the second address information are each received in a contact header; and accepting at the call session control function the received de-registration request message if the result of comparing indicates that the second address information is identical to the first address information.

\* \* \* \* \*

UNITED STATES PATENT AND TRADEMARK OFFICE
CERTIFICATE OF CORRECTION

PATENT NO. : 9,060,005 B2  
APPLICATION NO. : 12/997153  
DATED : June 16, 2015  
INVENTOR(S) : Thomas Belling et al.

Page 1 of 1

It is certified that error appears in the above-identified patent and that said Letters Patent is hereby corrected as shown below:

Title Page, Item (22): Please delete "Jun. 9, 2009" and replace with --Jun. 4, 2009--.

Signed and Sealed this  
Twenty-fourth Day of November, 2015

Michelle K. Lee  
*Director of the United States Patent and Trademark Office*